US008144987B2

(12) United States Patent
Cocosco et al.

(10) Patent No.: US 8,144,987 B2
(45) Date of Patent: Mar. 27, 2012

(54) METHOD, A SYSTEM AND A COMPUTER PROGRAM FOR SEGMENTING A SURFACE IN A MULTI-DIMENSIONAL DATASET

(75) Inventors: Christian Adrian Cocosco, Hamburg (DE); Stewart Young, Hamburg (DE); Thomas Netsch, Eindhoven (NL); Michael Kaus, Toronto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1197 days.

(21) Appl. No.: 11/911,128

(22) PCT Filed: Apr. 13, 2006

(86) PCT No.: PCT/IB2006/051145
§ 371 (c)(1),
(2), (4) Date: Oct. 10, 2007

(87) PCT Pub. No.: WO2006/109269
PCT Pub. Date: Oct. 19, 2006

(65) Prior Publication Data
US 2009/0060319 A1 Mar. 5, 2009

(30) Foreign Application Priority Data
Apr. 13, 2005 (EP) ..................................... 05102894

(51) Int. Cl.
G06K 9/00 (2006.01)
G06K 9/34 (2006.01)
(52) U.S. Cl. ......................... 382/173; 382/128; 382/154
(58) Field of Classification Search ........................ None
See application file for complete search history.

(56) References Cited

U.S. PATENT DOCUMENTS 5,999,653 A * 12/1999 Rucklidge et al. ............ 382/227
6,591,004 B1 7/2003 VanEssen
6,975,755 B1 * 12/2005 Baumberg ..................... 382/154
2005/0101855 A1 5/2005 Miga
2005/0148859 A1 * 7/2005 Miga et al. .................... 600/410

(Continued)

FOREIGN PATENT DOCUMENTS
WO 03023717 A2 3/2003

(Continued)

OTHER PUBLICATIONS

Gang Pan; Zhaohui Wu; Yunhe Pan, "Automatic 3D face verification from range data", IEEE International Conference on Acoustics, Speech, and Signal processing (ICASSP). 2003, vol. 3, 193-196.*

(Continued)

*Primary Examiner* — Samir Ahmed
*Assistant Examiner* — Li Liu

(57) ABSTRACT

A method is arranged to segment a surface in a multi-dimensional dataset comprising a plurality of images. Data processing and data acquisition steps can be temporally or geographically distanced, so that the results of a suitable data segmentation are accessed. Next, suitable plurality of image features resembling possible spatial positions of the surface conceived to be segmented are selected and accessed. The features are subsequently matched for all image portions, whereby for each feature a matching error is assigned. A pre-defined selectivity factor is accessed defining a maximum allowable variable fraction of the features having largest matching errors which can be discarded. The segmentation of the sought surface is performed, whereby the discarded features are not taken into account for evaluating the quality of fit of a candidate deformation. The resulting surface is displayed on a suitable display means.

20 Claims, 5 Drawing Sheets

U.S. PATENT DOCUMENTS

Figure 1:
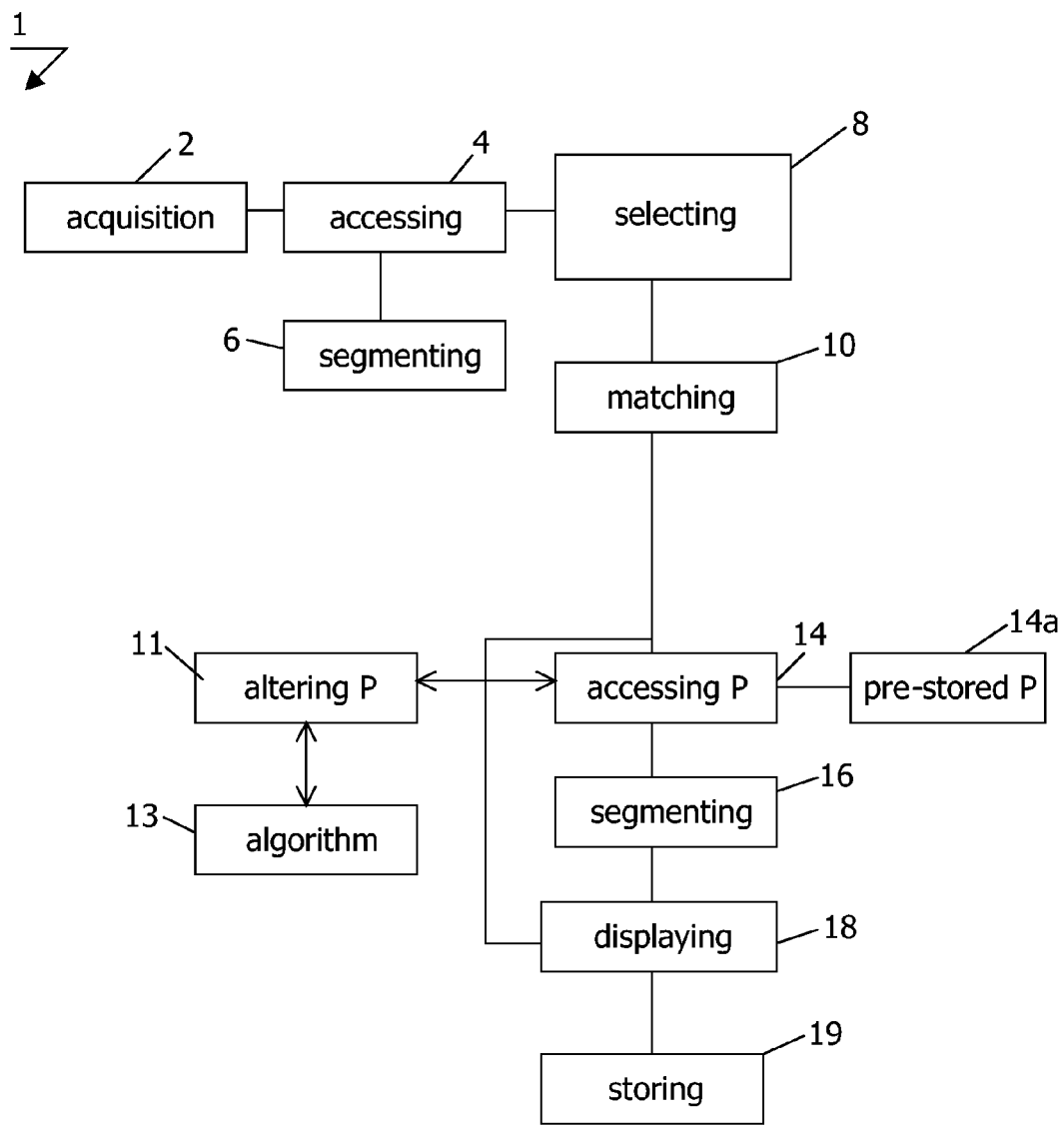

2005/0169507 A1* 8/2005 Kreeger et al. .............. 382/128
2006/0126922 A1* 6/2006 Von Berg et al. ............ 382/154
2007/0230798 A1* 10/2007 Naylor et al. ................ 382/219

FOREIGN PATENT DOCUMENTS

WO            2004068401 A2    8/2004

OTHER PUBLICATIONS

Achermann, B.; Bunke, H.; "Classifying range images of human faces with Hausdorff distance", 15th International Conference on Pattern Recognition, 2000, pp. 809-813 vol. 2.*

Hayet, J.B.; Lerasle, F.; Devy, M.; "A visual landmark framework for indoor mobile robot navigation", IEEE International Conference on Robotics and Automation, 2002 , 3942-3947 vol. 4.*

Han, I.; Il Dong Yun; Sang Uk Lee; "Model-based object recognition using the Hausdorff distance with explicit pairing", International Conference on Image Processing, 1999, 83-87 vol. 4.*

Van Ginneken, Bram et al "Active Shape Model Segmentation with Optimal Features" IEEE Trans. on Medical Imaging, vol. 21, No. 8, pp. 924-933 Aug. 2002.

Wroblewska, A. et al "Segmentation and Feature Extraction for Reliable Classification of Microcalcifications in Digital Mammograms" OPTO-Electronics Review vol. 11, No. 3,pp. 227-235, 2003.

Weese J. et al "Shape Constrained Deformable Models for 3D Medical Image Segmentation" Lecture Notes in Computer Science, Springer Verlag, NY vol. 2082, Jun. 18, 2001, pp. 380-387 (XP009027152).

Mount D.M. et al "Efficient Algorithms for Robust Feature Matching" Pattern Recognition. vol. 32, 1999.

* cited by examiner

METHOD, A SYSTEM AND A COMPUTER PROGRAM FOR SEGMENTING A SURFACE IN A MULTI-DIMENSIONAL DATASET

The invention relates to a method of segmenting a surface in a multi-dimensional dataset comprising a plurality of images.

The invention further relates to a system for segmenting a surface in a multi-dimensional dataset comprising a plurality of images.

The invention still further relates to a workstation.

The invention still further relates to a viewing station.

The invention still further relates to a computer program for segmenting a surface in a multi-dimensional dataset comprising a plurality of images.

The invention still further relates to a user interface for segmenting a surface in a multi-dimensional dataset comprising a plurality of images.

An embodiment of the method as is set forth in the opening paragraph is known from the publication J. Weese et al "Shape Constrained Deformable Models for 3D Medical Image Segmentation", Proc. IPMI 380-387, 2001. The known method is in particular arranged to improve the robustness of an image segmentation method using a prior shape information about an object conceived to be segmented. In the known method the shape information is embedded into an elastically deformable surface shape model, whereby adaptation to the image is governed by an external energy which is derived from local surface detection and an internal energy, which constrains the deformable surface to stay close to the sub-space defined by the shape model.

It is a disadvantage of the known method that its reliability is highly dependent on accuracy of elastic constrains which are arranged to describe a motion of a movable body. In practice, due to imaging artifacts or imperfect feature extraction, some of the features extracted from the image will in fact not belong to the object, or the object's shape may have local deviations from deformation range allowed by the shape model. Thus, in presence of such "outlier" extracted features the segmentation result may be incorrect.

It is an object of the invention to improve accuracy of the image segmentation methodology.

To this end the method according to the invention comprises the steps of:
accessing a plurality of features within said images;
accessing an a-priori determined selectivity factor;
segmenting the plurality of images yielding the surface by matching said plurality of features in the multi-dimensional dataset whereby for each feature a respective matching error is computed, whereby a variable fraction of features with largest respective matching errors is ignored up to a limit given by the selectivity factor.

The technical measure of the invention is based on the insight that by defining the selectivity factor, it being, for example, a certain proportion of the features that have largest matching errors, and by incorporating it into a suitable segmentation algorithm, the accuracy of the segmented surface is improved. Preferably, the features conceived to be selected resemble candidate locations for the position of the segmented surface, in other words the surface should be deformed such that it goes through all the selected features, avoiding features which are discarded in accordance with the selectivity factor.

It is noted that a concept of image registration based on ignoring a pre-set proportion of outliers, is known per se from D. M. Mount et al "Efficient algorithms for robust feature matching", Pattern Recogn. 32, p. 17, 1999. In the known method two temporally discontinued images are matched using a computation technique whereby a pre-determined matching accuracy is preserved by ignoring some features in the image which exhibit outstanding matching accuracy with respect to other features in the image.

In the method according to the invention it is recognized that there is a benefit from ignoring a variable fraction of a potential location of the segmented surface in a preparatory step for identifying an optimal fraction of outliers features yielding accurate segmentation result. Every image segmentation, corresponding to a variable fraction of the features to be ignored, is preferably assigned a score, whereby the segmentations are compared with respect to the individual scores and the best one is selected. The pre-determined value of the selectivity factor may be empirically determined. For applications, conceived to be used for images of a movable body, notably a heart, it is useful to set the selectivity factor to few percent, for example to a value of 10-15% has shown to provide reliable results. It is noted that if the value of the selectivity factor is too low, some outlier features will be considered in the model matching reducing the topological accuracy of the resulting segmented surface. If the value of the selectivity factor is too high, some correct features may be wrongly excluded, which may result in parts of the real object not being correctly segmented.

In an embodiment of the method according to the invention the method further comprises the steps of:
reconstructing the surface in the multi-dimensional dataset;
displaying the surface on a display means;
or:
reconstructing the surface in the multi-dimensional dataset;
displaying the surface on a display means;
altering the selectivity factor yielding a further selectivity factor;
re-segmenting the plurality of images, whereby a fraction of image features with largest respective matching errors are ignored in accordance with the further selectivity factor;
reconstructing a further surface in the multi-dimensional dataset;
displaying the further surface on a display means.

It is found to be particularly advantageous to allow for an adaptive optimization of the selectivity factor for each image segmentation step. It is possible, that the method uses a semi-automatic approach, whereby an operator assesses a degree of a topological fit between the segmented surface and the object in the image. In an optimal situation, especially where the initial value of the selectivity factor is based on profound empiric knowledge, no further iterations are needed. Thus, the operator inspects the displayed surface, preferably overlaid on the original data, and accepts the segmentation results, which may be then, for example, saved for archiving purposes and/or exported for a remote analysis. In case when the operator is of an opinion that a better topological fit is feasible, he may suitably alter (increase or decrease) the selectivity factor and the method according to the invention will proceed by re-segmenting a further surface based on the further selectivity factor and by visualizing the reconstructed further surface on suitable display means, preferably by overlaying the reconstructed surface on the original data. If the operator is satisfied he exits the segmentation routine, otherwise, he alters the selectivity factor and the process repeats unit the operator is satisfied. From our experience it is seen that the segmentation converges within just a few iterations. With the present embodiment of the method according to the invention a fast and robust automated segmentation is enabled with minimal operator interaction, whereby the image segmentation method is adaptable to unknown proportions of image artifacts and object shape deviations from the model.

In a further embodiment of the method according to the invention, the step of altering the selectivity factor is performed automatically in accordance with a pre-determined algorithm.

It is found to be preferable to automate a process of iterative adaptation of the selectivity factor. Preferably a suitable look-up table is prepared beforehand for altering the selectivity factor. Alternatively, it is possible to alter the selectivity factor in accordance with a pre-selected function. Still alternatively, it is possible to use region-based measured of segmentation quality instead of, or in addition to, surface-based measures. An example of a suitable region-based measure of the segmentation quality is a computation of a texture consistency of the image within a pre-defined region; for example: the regions delineated by the surface representing the segmentation (for example: the inside and the outside of the surface). Still alternatively, the user may be given an option to speed-up the alteration process, by indicating his degree of satisfaction. For poor degrees of satisfaction, the algorithm may jump to a further entry in the look-up table, or to a further factor in the functional dependency. Various modifications of the alteration algorithm are possible. For example, for any model-based, notably medical image segmentation application, the model is typically built from a set of reference segmentations, for example obtained using a careful manual tracing procedure executed by an expert. The two parameters for an initial selectivity factor P_start and its that part of an increment for the variation of the selectivity factor P_step can be estimated as a by-product of the model building process. Since reference segmentations are available, an automated optimization procedure can be used to find the optimal final selectivity factor P=P_final giving the optimal proportion of outliers for each image dataset. It is preferable, that for optimization of the segmentation process a suitable plurality of candidate segmentations is pre-computed corresponding to a variety of selectivity factors. The user may then just scroll between corresponding segmented surfaces and select the optimal one. Also, the user may select the preferable segmentation from the ones already computed and use it as a starting point for a suitable further interactive adjustment of the selectivity factor. Based on some empiric practice a histogram for P_final can be built showing the number of final selections per certain value of the selectivity factor P_final. Based on this histogram, a P_start being the pre-stored value of the selectivity factor, can be pre-set for a new, not inspected dataset. An increment P_step can be chosen depending on the spread on the histogram for a certain image category. Thus, a robust and automated image segmentation method is built, which results in an improved topological accuracy of the image segmentation step. Preferably, for the suitable image segmentation routine an image segmentation algorithm based on deformable models, is selected.

A system according to the invention comprises:

an input for accessing a plurality of features within said images and for accessing an a-priori determined selectivity factor;

a computing means for segmenting the plurality of images yielding the surface by matching said plurality of features in the multi-dimensional dataset whereby for each feature a respective matching error is computed, whereby a variable fraction of features with largest respective matching errors is ignored up to a limit given by the selectivity factor.

It is advantageous that the system according to the invention is implemented as a workstation allowing for data analysis off-line. Preferably, the system according to the invention further comprises a reconstruction unit for reconstructing the surface in the multi-dimensional dataset and a display means for displaying the surface. Still preferably, it is advantageous that the system according to the invention is implemented as a viewing station allowing for interactive data analysis off-line. Still preferably, the system according to the invention comprises a data acquisition unit for acquiring the multi-dimensional dataset.

The computer program according to the invention comprises the following instructions for causing the processor to carry out the steps of:

accessing a plurality of features within said images;

accessing an a-priori determined selectivity factor;

segmenting the plurality of images yielding the surface by matching said plurality of features in the multi-dimensional dataset whereby for each feature a respective matching error is computed, whereby a variable fraction of features with largest respective matching errors is ignored up to a limit given by the selectivity factor.

The user interface according to the invention is arranged for:

displaying a reconstructed surface on a display means, whereby said reconstructed surface is computed based on a segmentation of respective image portions in a multi-dimensional dataset comprising plurality of features, whereby a variable fraction of features with largest matching errors is ignored up to a limit set by a pre-determined selectivity factor;

altering the selectivity factor yielding a further selectivity factor;

re-segmenting the plurality of images yielding the surface, whereby a fraction of features with largest respective matching errors is ignored in accordance with the further selectivity factor;

reconstructing the further surface in the multi-dimensional dataset;

displaying the further surface on the display means.

Preferably, the user interface is further arranged to store each respective further selectivity factors for each iteration. In this case a suitable back-tracking is possible, in situations where the selectivity factor is altered beyond its optimal value so that the topological fit deteriorated with respect to a previous iteration. In this case the user is enabled to return to a previous value of the selectivity factor, starting from which he may change the value of the increment P-step of the selectivity factor. In this way a fine-tuned optimization of the selectivity factor is enabled. Preferably, the user interface is further arranged to display a plurality of surface segmentations corresponding to a plurality of the ahead-of-time, notably background or off-line, computations of segmentations for different values of the selectivity factor; this way the user will not have to wait for a re-segmentation in order to select the most favorable one. This technical measure improves a workflow.

These and other aspects of the invention will be discussed in further detail with reference to figures.

FIG. 1 presents a schematic view of an embodiment of a method according to the invention.

Figure 2:
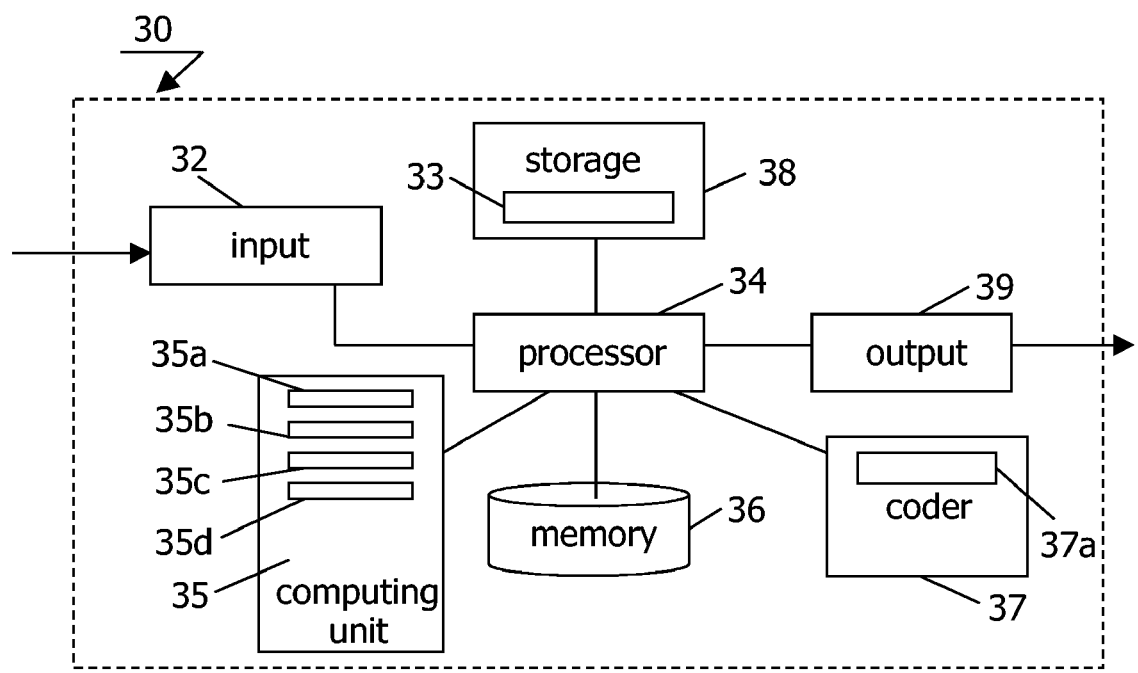

FIG. 2 presents in a schematic way an embodiment of the system according to the invention.

Figure 3:
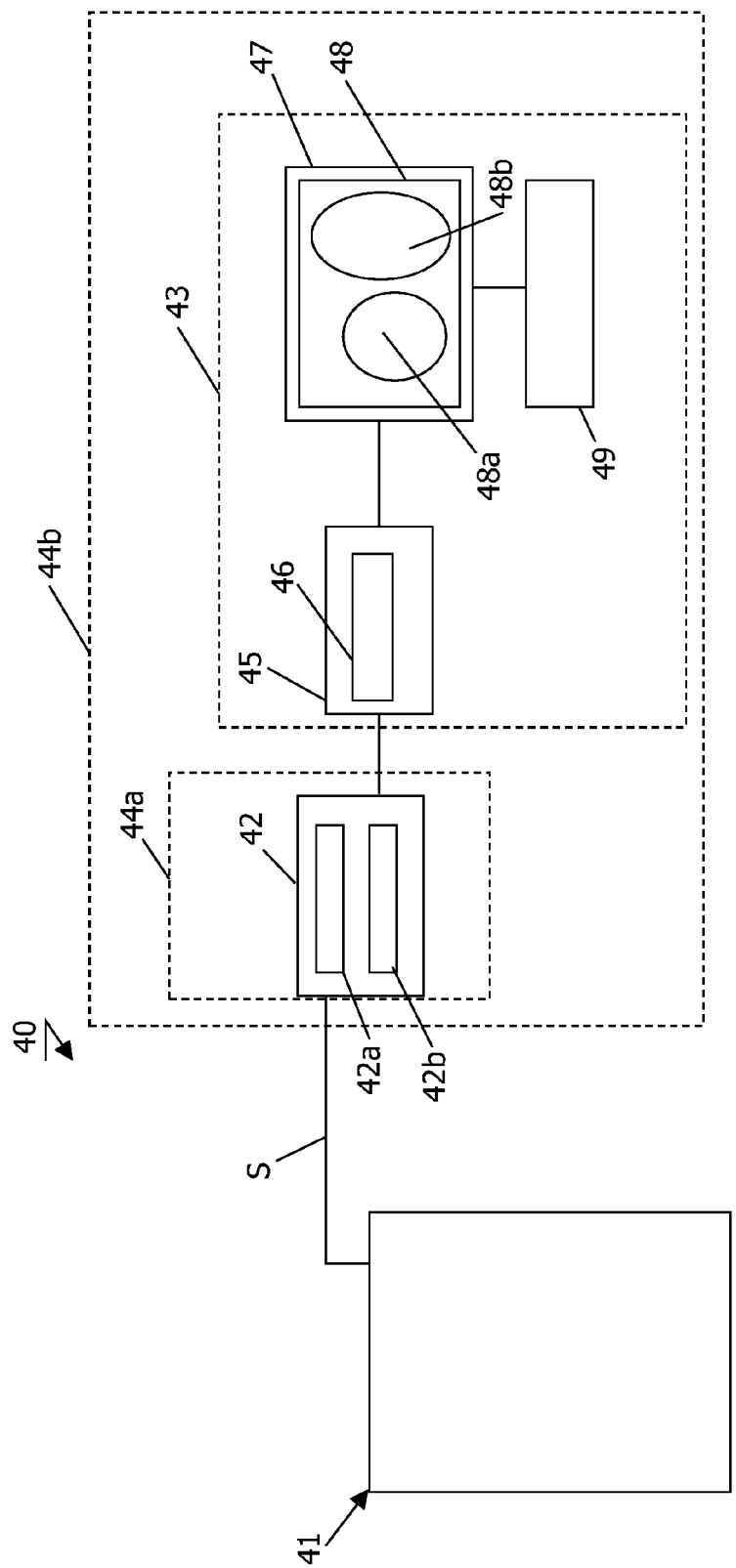

FIG. 3 presents in a schematic way a further embodiment of the system according to the invention.

Figure 4:
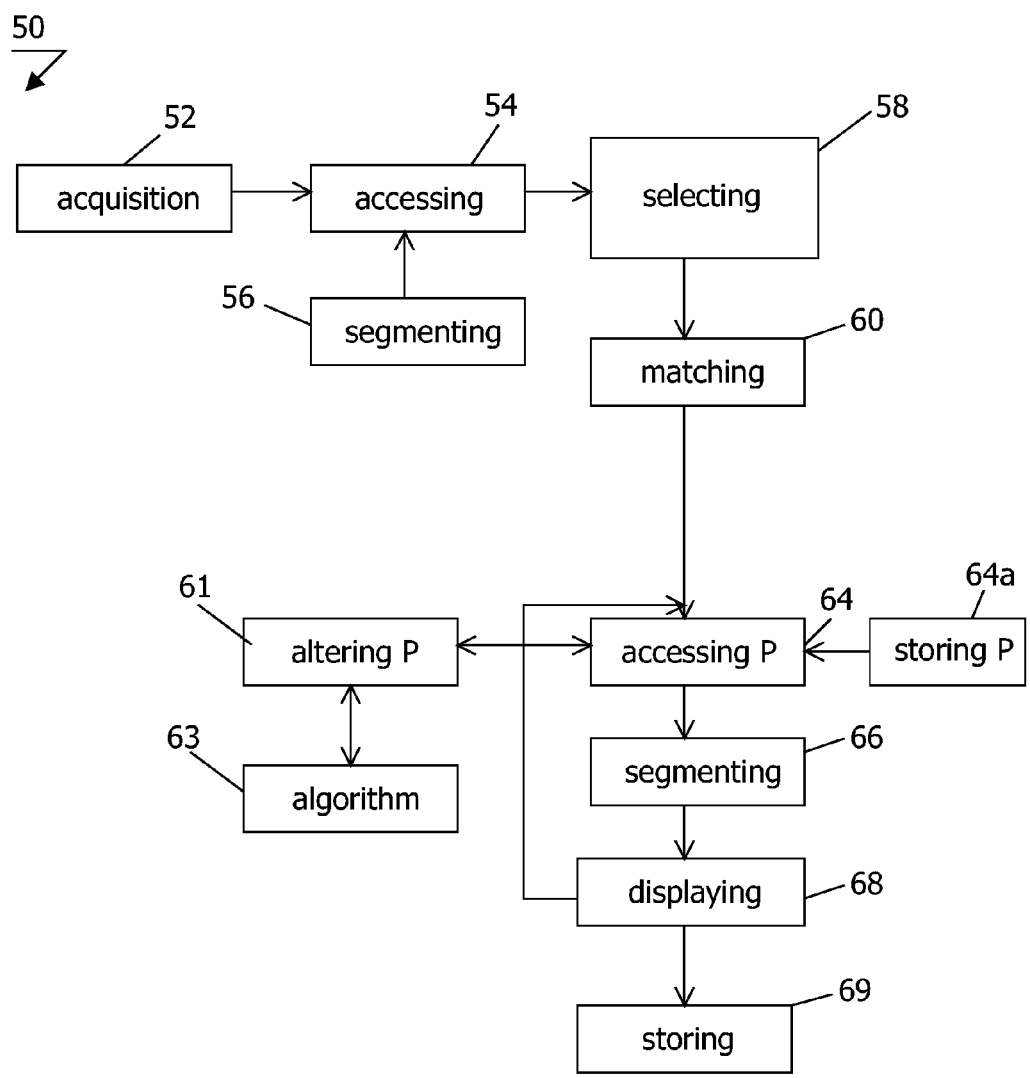

FIG. 4 presents in a schematic way an embodiment of a flow-chart of a computer program according to the invention.

Figure 5:
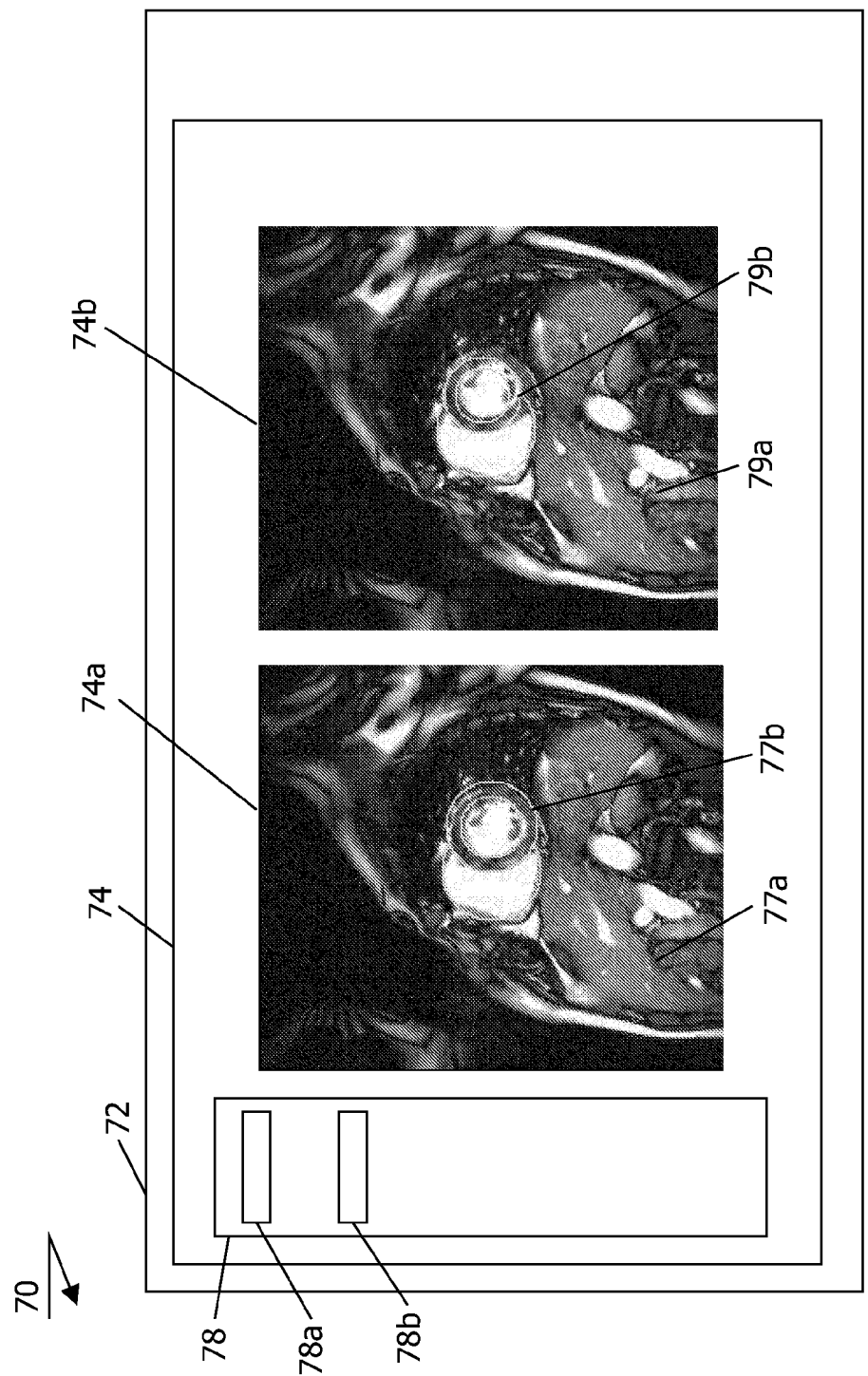

FIG. 5 presents in a schematic way an embodiment of a user interface according to the invention.

FIG. 1 presents a schematic view of an embodiment of a method according to the invention. The method 1 according to the invention is arranged to segment a surface in a multi-dimensional dataset comprising a plurality of images. Preferably, the images are acquired using a suitable data-acquisition unit at a preparatory step 2. It is possible that data processing and data acquisition steps are temporally or geographically distanced, so that at step 4 the results of a suitable data segmentation step 6 are accessed, whereby said results comprise portions of the image which are subsequently used to segment the surface using the method of the invention. It is noted that the step of image segmentation may be performed in real time or may be carried out beforehand. In the latter case the results of the initial data segmentation 6 are accessed by suitable computer means. Next, at step 8 a suitable plurality of image features resembling possible spatial positions of the surface conceived to be segmented are selected and accessed. Such selection may be performed based on a prior knowledge, or in accordance with a certain criterion, like a percentage of a total amount of distinguishable features. It is noted that said percentage may as well be set to 100%. Upon a selection of a suitable amount of features, they are matched for all image portions at step 10. A procedure of feature matching is per se known in the art of data processing and will not be explained in detail here. It is, however, essential that during the matching procedure of step 10 for each feature of said plurality of features a matching error is assigned. At step 14 a pre-defined selectivity factor is accessed. It is possible that a plurality of selectivity factors 14a is pre-stored, whereby an actual selectivity factor is being selected from said pre-stored plurality. In accordance with the selectivity factor accessed at step 14, a fraction of the features having largest matching errors are discarded and a segmentation of the sought surface is performed at step 16, whereby the discarded features are not taken into account for evaluating the quality of fit of a candidate deformation of the surface. The resulting surface is being displayed on a suitable display means at step 18, whereby it is preferably overlaid on original, notably diagnostic data for user's analysis. In case when the user is satisfied with the result of the segmentation, the segmented surface is stored at step 19. Otherwise, the process is returned to step 14, where a further selectivity factor is accessed. It is possible that the further selectivity factor is altered at step 11 by a user's input, or, alternatively it may be provided by a certain alteration algorithm 13. An example of a simple alteration algorithm is a loop between a plurality of pre-stored values of a look-up table. Alternatively, a functional dependency may be used or a sophisticated algorithm based on an image consistency factor which is in turn based on a texture consistency of the image within a pre-determined region. The further selectivity factor is being computed in real time and being (automatically) optimized based on the image consistency factor. In other words, the optimal selectivity factor for the most accurate segmentation is automatically computed instead of indicated by the user.

FIG. 2 presents a schematic view of an embodiment of the system according to the invention. The system according to the invention is arranged for segmenting a surface in a multi-dimensional dataset comprising a plurality of images. The system 30 comprises an input 32 for accessing a plurality of features within said images. It is noted that the features may be a result of a suitable preparatory image segmentation step. The features may also be accessed from a suitable storage unit (not shown), which may be situated locally or remotely. Alternatively and/or additionally the input 32 can be arranged to receive said features from a suitable internal data segmentation algorithm 35d. It is noted that in this case the multi-dimensional dataset is accessed and is then made available by the input 32 to a computing unit 35 of the system 30, to perform the preparatory image segmentation using the segmentation algorithm 35d.

The core of the system 30 is formed by a processor 34 which is arranged to operate the components of the system 30, it being the input 32, the computing unit 35, the working memory 36, and the background storage unit 38. An example of a suitable processor 34 is a conventional microprocessor or signal processor, the background storage 38 (typically based on a hard disk) and working memory 36 (typically based on RAM). The background storage 38 can be used for storing suitable datasets (or parts of it) when not being processed, and for storing results of the image segmentation step, the step of selecting suitable features and a selectivity factor, as well as results of any other suitable intermediate or final computational steps. The working memory 36 typically holds the (parts of) dataset being processed and the results of the segmentation of the portions of the surface. The computing unit 35 preferably comprises a suitable number of executable subroutines 35a, 35b, 35c, and 35d. The subroutine 35a is arranged to perform a selection of a suitable plurality of features within the portions of the image. The subroutine 35b is arranged to match the selected plurality of features in the multi-dimensional dataset, whereby for each feature a matching error is assigned. The subroutine 35c is arranged to access and/or to compute an actual value of the selectivity factor P. The subroutine 35d is arranged to segment the surface by discarding a variable fraction of features with largest matching error, a maximum amount of such features being governed by the actual selectivity factor P. The resulting sub-segmentations are then assigned a score, whereby the sub-segmentations are mutually compared with respect to individual scores. The optimum sub-segmentation is then selected to be the resulting segmentation exhibiting the sought surface.

The system 30 according to the invention further comprises an overlay coder 37 arranged to produce a rendering of a suitable overlay of the segmented surface with the original data, notably diagnostic images. Preferably, the computed overlay is stored in a file 37a. Preferably, overlay coder 37, the computing unit 35 and the processor 34 are operable by a computer program 33, preferably stored in memory 38. An output 39 is used for outputting the results of the processing, like overlaid mage data representing the anatomy of the heart overlaid with the suitable rendering of the segmented surface.

FIG. 3 presents a schematic view of a further embodiment of the apparatus according to the invention. The system 40 is arranged for segmenting a surface in a multi-dimensional dataset, for example comprising a plurality of temporally spaced cardiac images. Preferably, the system 40 comprises a data acquisition unit 41, notably a magnetic resonance imager, a tomography unit, an ultra-sound apparatus, or an X-ray unit for acquiring the multi-dimensional dataset. Usually the data is conceived to be transferred from the data acquisition unit 41 to the processor 42 by means of a suitably coded signal S. The processor performs suitable data segmentation, as is explained with reference to FIG. 2, whereby at its output a variety of possible data can be produced. For example, it is possible that data 42a comprises segmentation of a first potential surface based on a first selectivity factor, the data 42b provides a segmentation of a second potential surface, based on a second selectivity factor, and so on. Preferably, the processor 42 is embedded in a workstation 44a.

Either of the data 42a, 42b, or a suitable combination thereof is made available to a further input 45 of a suitable viewer 43. Preferably, the further input 45 comprises a suitable further processor arranged to operate a suitable interface using a program 46 adapted to control a user interface 48 so that an image of the anatomic data is suitably overlaid with the results of the segmentation step, notably with data 42a, 42b thus yielding image portions 48a, 48b. Preferably, for user's convenience, the viewer 43 is provided with a high-resolution display means 47, the user interface being operable by means of a suitable interactive means 49, for example a mouse, a keyboard or any other suitable user's input device. Preferably, the user interface allows the user to interact with the image for purposes of altering the actual selectivity factor P, which then will be used by the system 40 for computing a further segmentation of the surface. Suitable graphic user input is translated into a variable by the computer program 46. This option allows for an accurate segmentation of the surface when the range of pre-stored or computed selectivity factors does not provide satisfying segmentation result. Preferably, the processor 42 and the viewer 43 are configured to form a viewing station 44b.

FIG. 4 presents in a schematic way an embodiment of a flow-chart of a computer program according to the invention. The computer program 50 according to the invention is arranged to segment a surface in a multi-dimensional dataset comprising a plurality of images. Preferably, the images are acquired using a suitable data-acquisition unit at a preparatory step 52. It is possible that data processing and data acquisition steps are temporally or geographically distanced, so that at step 54 the results of a suitable data segmentation step 56 are accessed using suitable data access subroutines yielding respective image features. These features are conceived to comprise portions of the image which are subsequently used to segment the surface using the method of the invention. It is noted that the step of image segmentation 56 may be performed in real time or may be carried out beforehand. In the former case use may be made of suitable per se known data segmentation algorithms. In the latter case the results of the initial data segmentation 56 are accessed by suitable computer input/output data access protocol. Next, at step 58 a suitable plurality of image features resembling possible spatial positions of the surface conceived to be segmented are selected. This step may be implemented by a suitable image analysis algorithm which is arranged to extract a certain feature from the image. Methods of feature extraction are known per se in the art and will not be explained here. Also, the feature selection may be performed based on a prior knowledge, or in accordance with a certain criterion, like a percentage of a total amount of distinguishable features. It is noted that said percentage may as well be set to 100%. Upon a selection of a suitable amount of features, they are matched for all image portions at step 60 using a suitable data matching subroutine. A procedure of feature matching is per se known in the art of data processing and will not be explained in detail here. It is, however, essential that during the matching procedure of step 60 for each feature of said plurality of features a matching error is assigned. At step 64 a pre-defined selectivity factor is accessed by a suitable data access subroutine. It is possible that a plurality of selectivity factors 64a is being pre-stored, whereby an actual selectivity factor is being selected from said pre-stored plurality. In accordance with the selectivity factor accessed at step 64, a variable fraction of the features having largest matching errors are discarded up to a maximum given by the selectivity factor yielding a plurality of respective sub-segmentations. Each sub-segmentation is assigned a score with respect to which the best one is selected yielding the sought surface at step 66, whereby the discarded features are not taken into account for computing the score. The resulting surface is being displayed on a suitable display means at step 68, whereby it is preferably overlaid on original, notably diagnostic data for user's analysis. It is preferable that for implementation of step 68 the computer program according to the invention is arranged to control a suitable graphic user interface. In case when the user is satisfied with the result of the segmentation, he signals this event by an appropriate computer command, after which the segmented surface is stored at step 69. Otherwise, the process is returned to step 64, where a further selectivity factor is accessed. It is possible that the further selectivity factor is altered at step 61 by a user's input, or, alternatively it may be provided by a certain alteration algorithm 63. An example of a simple alteration algorithm is a loop between a plurality of pre-stored values of a look-up table. Alternatively, a functional dependency may be used or a sophisticated algorithm based on an image consistency factor which is in turn based on a texture consistency of the image within a pre-determined region. The further selectivity factor is being computed in real time and being optimized based on the image consistency factor.

FIG. 5 presents in a schematic way an embodiment of a user interface according to the invention. An embodiment of the user interface 70 according to the invention comprises a graphic interface 74 whereto alpha-numerical information and image information can be projected. For this purpose the graphic interface 74 comprises an interactive window 78 with actuatable buttons of a kind 78a, 78b. When the operator initiates a "display" button 78a a suitable plurality of images 74a, 74b can be projected in the image screen of the graphic screen 74. In this example two images are shown, which comprise diagnostic information 77a, 79a overlaid with segmented surface 77b, 79b. In this embodiment the segmented surfaces correspond to different fractions of features which were discarded for different selectivity factors. Alternatively, each image 74a or 74b may comprise a movie looping over the pre-calculated segmentations, whereby the user may either approve one of the pre-calculated segmentations, or to alter the selectivity factor manually. In the latter case the results of the new segmentation will be projected on the screen 72 accordingly.

The invention claimed is:

1. A method, comprising:
    performing a first segmentation on a multi-dimensional dataset to produce a first segmented image, whereby the first segmented image represents less than the multi-dimensional dataset;
    accessing a plurality of features within said first segmented image;
    accessing an a-priori determined selectivity factor; and
    performing a second segmentation on the first segmented image yielding a surface of the multi-dimensional dataset by matching said plurality of features, whereby for each feature of the plurality of features a respective matching error is computed, whereby a variable fraction of features of the plurality of features with largest respective matching errors is ignored up to a limit given by the selectivity factor.

2. A method according to claim 1, whereby the method further comprises the steps of:
    reconstructing the surface of the multi-dimensional dataset; and
    displaying the surface on a display means.

3. The method of claim 1, whereby the a-priori determined selectivity factor is pre-stored.

4. The method of claim 1, whereby the multi-dimensional dataset is a medical image dataset that includes data pertaining to an internal organ structure.

5. The method of claim 1, comprising:
reconstructing the surface in the multi-dimensional dataset;
displaying the surface on a display means;
altering the selectivity factor yielding a second selectivity factor;
performing a third segmentation yielding a second surface, whereby a fraction of features with largest respective matching errors are ignored in accordance with the second selectivity factor;
reconstructing the second surface in the multi-dimensional dataset; and
displaying the second surface on the display means.

6. A method according to claim 5, whereby the step of altering the selectivity factor is performed automatically in accordance with a pre-determined algorithm.

7. A method according to claim 6, whereby the algorithm is arranged to compute an image consistency factor based on a texture consistency of the image within a pre-determined region, the selectivity factor being optimized based on the image consistency factor.

8. A method according to claim 6, whereby the algorithm is arranged to allow optimization of the second selectivity factor.

9. A system for segmenting a surface in a multi-dimensional dataset comprising a plurality of images, said system comprising:
an input for accessing a plurality of features within said images, whereby the multi-dimensional dataset is a medical image dataset of an internal anatomical structure; and
a computing means for segmenting the plurality of images yielding the surface by matching said plurality of features in the multi-dimensional dataset whereby for each feature of the plurality of features a respective matching error is computed, whereby a variable fraction of features of the plurality of features with largest respective matching errors is ignored up to a limit given by an a-priori determined selectivity factor.

10. A system according to claim 9, whereby said system further comprises:
a reconstruction unit for reconstructing the surface in the multi-dimensional dataset; and
a display means for displaying the surface.

11. A system according to claim 9, whereby the system further comprises a data acquisition unit for acquiring the multi-dimensional dataset.

12. A processor operatively coupled to a memory that retains a computer program, said computer program comprising instructions for causing the processor to carry out the steps of:
performing a first segmentation on a multi-dimensional dataset to produce a first segmented image, whereby the first segmented image represents less than the multi-dimensional dataset;
selecting a plurality of features within the first segmented image;
assigning a matching error for each feature of the plurality of features;
accessing an a-priori determined selectivity factor;
segmenting the first segmented image yielding a surface by matching said plurality of features in the multi-dimensional dataset whereby for each feature of the plurality of features a respective matching error is computed, whereby a variable fraction of features of the plurality of features with largest respective matching errors is ignored up to a limit given by the selectivity factor;
displaying the surface upon a display means; and
identifying that the first segmented image should be re-segmented.

13. The processor of claim 12, whereby displaying the surface upon the display means comprises displaying the surface overlaid upon diagnostic data upon the display means.

14. The processor of claim 13, said computer program comprising instructions for causing the processor to carry out the steps of:
accessing a second a-priori determined selectivity factor in response to identifying that the first segmented image should be re-segmented, whereby the second a-priori determined selectivity factor is provided by an alteration algorithm; and
segmenting the first segmented image yielding a second surface, whereby the variable fraction of features with largest respective matching errors is ignored up to a limit given by the second selectivity factor.

15. A method comprising:
displaying, via a display means, a first reconstructed surface of a tissue of interest, whereby the first reconstructed surface is computed based on a first segmentation of a multi-dimensional dataset comprising a plurality of features, whereby for each feature of the multi-dimensional dataset a respective matching error is computed, and whereby the first reconstructed surface is segmented from a fraction of features from a set of features, wherein the fraction of features only includes features with matching errors up to a first predetermined matching error limit; and
displaying, via the display means, a second reconstructed surface of the tissue of interest, whereby the second reconstructed surface is computed based on a second segmentation of the multi-dimensional dataset whereby the second reconstructed surface is segmented from a fraction of features from a set of features, wherein the fraction of features only includes features with matching errors up to a second predetermined matching error limit that is different from the first predetermined matching error limit.

16. The method of claim 15, comprising:
accessing the second predetermined matching error limit after displaying the first reconstructed surface.

17. The method of claim 16, whereby the second predetermined matching error limit is user-entered into a computer after displaying the first reconstructed surface and whereby the second predetermined matching error limit is accessed from the computer.

18. The method of claim 17, whereby the second predetermined matching error limit is greater than the first predetermined matching error limit.

19. The method of claim 17, whereby the first predetermined matching error limit is greater than the second predetermined matching error limit.

20. The method of claim 16, whereby the first and second predetermined matching error limits are given by first and second selectivity factors, respectively.

* * * * *